United States Patent
Gao et al.

(10) Patent No.: US 8,352,244 B2
(45) Date of Patent: Jan. 8, 2013

(54) ACTIVE LEARNING SYSTEMS AND METHODS FOR RAPID PORTING OF MACHINE TRANSLATION SYSTEMS TO NEW LANGUAGE PAIRS OR NEW DOMAINS

(75) Inventors: Yuqing Gao, Hawthorne, NY (US); Bing Xiang, Yorktown Heights, NY (US); Bowen Zhou, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 12/506,483

(22) Filed: Jul. 21, 2009

(65) Prior Publication Data

US 2011/0022381 A1    Jan. 27, 2011

(51) Int. Cl.
  *G06F 17/28*    (2006.01)
(52) U.S. Cl. .................. 704/7; 704/10; 704/2; 704/235; 704/277; 704/4; 704/8; 704/9; 703/23; 707/602; 715/234; 717/106; 717/112
(58) Field of Classification Search .................... 704/10, 704/2, 235, 277, 4, 8, 9; 703/23; 707/602; 715/234; 717/106, 112
  See application file for complete search history.

(56) References Cited

U.S. PATENT DOCUMENTS

| | | | | |
|---|---|---|---|---|
| 5,812,818 A | * | 9/1998 | Adler et al. | 703/23 |
| 6,085,162 A | * | 7/2000 | Cherny | 704/277 |
| 6,223,150 B1 | * | 4/2001 | Duan et al. | 704/9 |
| 6,266,642 B1 | * | 7/2001 | Franz et al. | 704/277 |
| 6,321,189 B1 | | 11/2001 | Masuichi et al. | |
| 6,519,557 B1 | * | 2/2003 | Emens et al. | 704/8 |
| 7,212,964 B1 | * | 5/2007 | Alshawi et al. | 704/10 |
| 7,295,963 B2 | | 11/2007 | Richardson et al. | |
| 7,559,051 B2 | * | 7/2009 | De Oliveira Kastrup Pereira et al. | 717/112 |
| 7,689,416 B1 | * | 3/2010 | Poirier | 704/235 |
| 7,853,555 B2 | * | 12/2010 | Peoples et al. | 707/602 |
| 2001/0029455 A1 | * | 10/2001 | Chin et al. | 704/277 |
| 2002/0087301 A1 | * | 7/2002 | Jones et al. | 704/2 |
| 2004/0102956 A1 | * | 5/2004 | Levin | 704/2 |
| 2004/0122656 A1 | * | 6/2004 | Abir | 704/4 |

(Continued)

FOREIGN PATENT DOCUMENTS

WO    WO2007068123 A1    6/2007

OTHER PUBLICATIONS

Callison-Burch, C., et al. Statistical Machine Translation With Word- and Sentence-Aligned Parallel Corpora, Annual Meeting of the ACL, Proceedings of the 42nd Annual Meeting on Association for Computational Linguistics. Jul. 2004. (8 Pages) http://acl.ldc.upenn.edu/acl2004/main/pdf/238_pdf_2-col.pdf.

(Continued)

*Primary Examiner* — Michael Colucci
(74) *Attorney, Agent, or Firm* — Tutunjian & Bitetto, P.C; Anne V. Dougherty

(57) ABSTRACT

Systems and methods for active learning of statistical machine translation systems through dynamic creation and updating of parallel corpus. The systems and methods provided create accurate parallel corpus entries from a test set of sentences, words, phrases, etc. by calculating confidence scores for particular translations. Translations with high confidence scores are added directly to the corpus and the translations with low confidence scores are presented to human translations for corrections.

22 Claims, 4 Drawing Sheets

U.S. PATENT DOCUMENTS

| | | | |
|---|---|---|---|
| 2005/0246680 A1* | 11/2005 | De Oliveira Kastrup Pereira et al. | 717/106 |
| 2006/0265209 A1* | 11/2006 | Bradford | 704/9 |
| 2007/0271088 A1* | 11/2007 | Waibel et al. | 704/9 |
| 2008/0221864 A1* | 9/2008 | Blumenthal | 704/4 |
| 2009/0144612 A1* | 6/2009 | Ishii et al. | 715/234 |
| 2009/0326911 A1* | 12/2009 | Menezes et al. | 704/2 |
| 2010/0274552 A1* | 10/2010 | Gao et al. | 704/2 |

OTHER PUBLICATIONS

Waibel, A., et al. Towards Language Portability in Statistical Speech Translation, ICASSP, 2004 IEEE International Conference on Acoustics, Speech, and Signal Processing. vol. 3. May 2004. (5 pages) pp. 765-768. http://www.cs.cmu.edu/~tanja/Papers/SchultzWaibel_icassp04.pdf.

Wang, C., et al. High-Quality Speech-to-Speech Translation for Computer-Aided Language Learning. ACM Transactions on Speech and Language Processing. vol. 3, No. 2. Jul. 2006. pp. 1-21. http://www.cs.pitt.edu/~litman/courses/slate/pdf/p1-wang.pdf.

Xi, C., et al. A Backoff Model for Bootstrapping Resources for Non-English Languages. Proceedings of Human Language Technology Conference and Conference on Empirical Methods in Natural Language Processing. Oct. 2005. pp. 851-858. http://www.cs.pitt.edu/~hwa/emnlp05.pdf.

* cited by examiner

ACTIVE LEARNING SYSTEMS AND METHODS FOR RAPID PORTING OF MACHINE TRANSLATION SYSTEMS TO NEW LANGUAGE PAIRS OR NEW DOMAINS

BACKGROUND

1. Technical Field

The present invention relates generally to active learning systems and methods in machine translation systems, and more specifically to active learning systems and methods for developing a parallel corpus in a statistical machine translation system for new language pairs or new domains.

2. Description of the Related Art

The increasing globalization of the international community has brought about an ever-growing demand for machine translation systems. Parallel corpus is a very essential resource for developing many machine translation systems, particularly for those that are based on statistical learning algorithms. Parallel corpus refers to sets of words, phrases and/or sentences from two different languages that are translations for each other.

Generally speaking, the performance and accuracy of a machine translation system increases with the size of the parallel corpus. Thus, when developing a statistical machine translation system (SMT) for new language pairs or new domains, the creation of a large, accurate parallel corpus is extremely important.

Current methods of parallel corpus creation rely solely on human translators to create translations and correct inaccurate translations produced by the SMT. As a result of the reliance on human translators, the process of updating parallel corpus in the current state of the art is typically expensive and slow.

SUMMARY

Embodiments of the present invention utilize active learning to update parallel corpus with increased speed and decreased cost. An active learning approach, where a machine can partially teach itself, does not rely solely on human translators and provides a great benefit to statistical machine translation systems by increasing translation performance while using less human resources.

Described herein is a method for creating or updating parallel corpus in a machine translation system. The method prepares a test set E to be updated, translates the test set E from a first language to a second language so as to create set F in the second language, translates set F back to the first language so as to create set E' in the first language, computes confidence scores for the translation of each item in the set based on the similarity of E and E', creates a subset of the highest confidence scores and adds the translations in the subset of the highest confidence scores directly to the parallel corpus without first presenting the translations to a human translator for correction.

The method for creating or updating parallel corpus in a machine translation system may also create a subset L of the lowest confidence scores, present the subset of the lowest confidence scores to human translators for correction and add the human corrections to the parallel corpus. Embodiments of the present invention also include presenting a Graphical User Interface (GUI) to a human translator providing at least the items in the subset of lowest confidence scores, a window to make translation corrections, and an update button.

In embodiments of the present invention, preparing a test set E to be updated includes translating a test set using the existing parallel corpus, calculating a translation accuracy score for the one or more items in the test set, comparing the translation accuracy score for each item to a desired performance score to determine whether the parallel corpus needs to be updated for that item and removing that item from the test set if the translation accuracy score for an item is equal to or greater than a desired performance score. One embodiment of the present invention displays a Graphical User Interface (GUI) to the user which includes controls for changing features to compute confidence scores, the features being at least one of a scoring metric and values used to create the subsets of the lowest and highest confidence scores.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
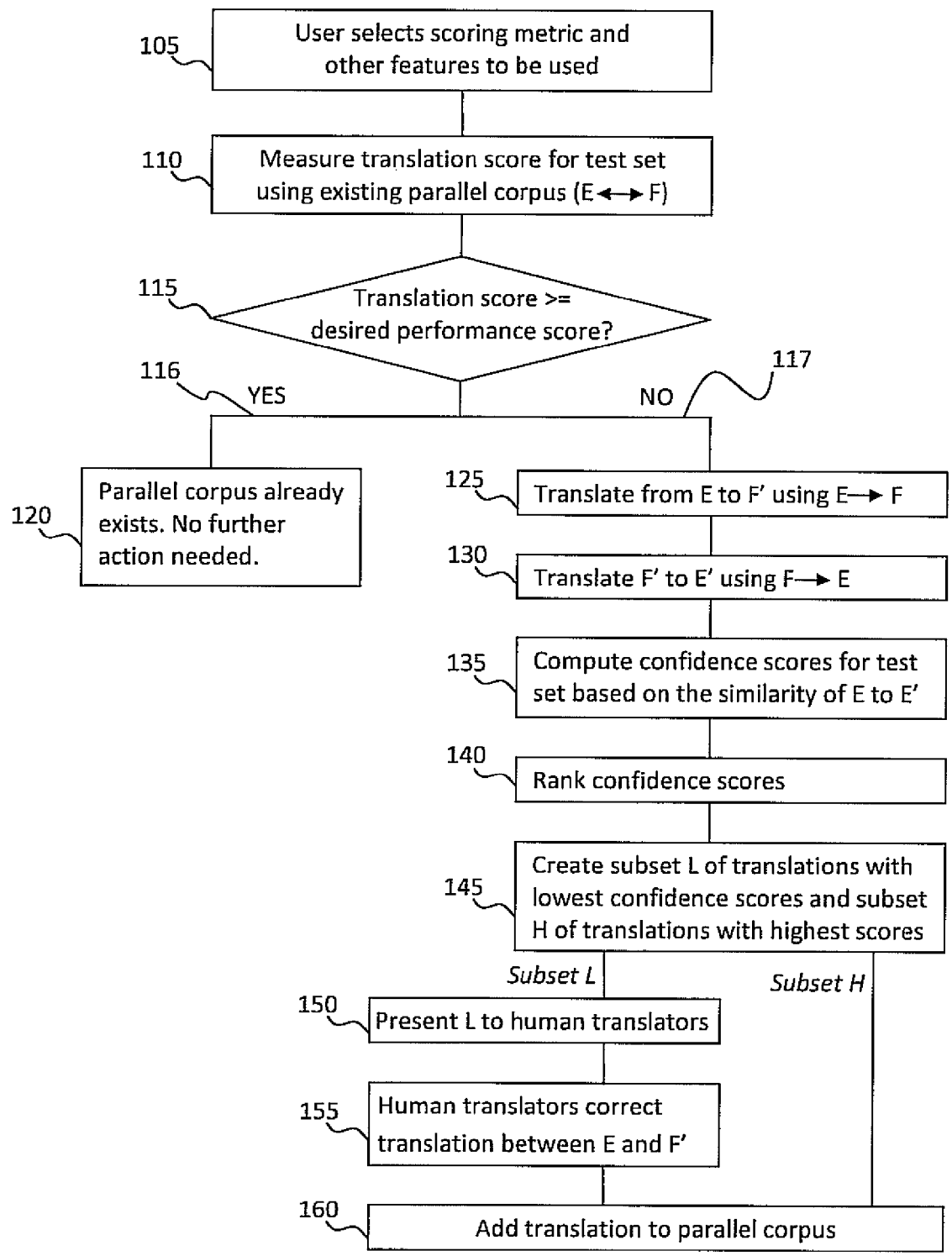
FIG. 1 is a block/flow diagram depicting the method steps performed to create or update parallel corpus of a machine translation system.

Embodiments disclosed herein provide systems and methods for active learning of statistical machine translation systems through dynamic creation and updating of parallel corpus. The embodiments provided create accurate parallel corpus entries from a test set of sentences, words, phrases, etc. by calculating confidence scores for particular translations. Translations with high confidence scores are added directly to the corpus and the translations with low confidence scores are presented to human translations for corrections.

In this manner, embodiments of the present invention avoid wasting human efforts on those sentences that the current statistical machine translation system (SMT) already translates properly. In addition, the present invention identifies the inaccurate translations that need human correction. Human correction may be needed, for example, to add missing words to the translation, correct syntax errors such as incorrect word sequence, or correct word sense.

It is to be appreciated that although the present invention will be described with respect to creating parallel corpus for a new language, all of the systems and methods described herein can easily be applied to creating parallel corpus for collections other than languages as well, such as domains.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference will now be made to the drawings in which like numerals represent the same or similar elements. For purposes of this disclosure, the first language will be referred to as E and the second language will be referred to as F.

FIG. 1 is a block/flow diagram of an illustrative system/method in accordance with the present invention. The blocks depicted in FIG. 1 are preferably executed by one or more processors in a system. The system/method starts with block 105, where the user selects the scoring metric(s) and the other features to be used in the calculation of the confidence scores. The user may also select the threshold values used to determine subsets L and H (discussed in more detail below). In one embodiment, the user makes these selections using a Graphical User Interface (GUI) such as the one portrayed in FIG. 2. The GUI will be discussed in more detail below.

In block 110, a translation score is measured for the translation of each item in a test set using the existing parallel corpus (E←→F) of the SMT. In block 115, the translation scores of each item in the test set are compared to a desired performance score. Any number of translation evaluation metrics may be used. In one embodiment, Bilingual Evaluation Understudy (BLEU) metrics are used.

If the score calculated in block 115 for a particular item in the test set is greater than or equal to the desired performance score, path 116 is followed to block 120. Block 120 indicates that an accurate parallel corpus entry already exists for this particular item; hence, no further action is needed.

If the item's score is lower than the desired performance score, path 117 is followed to block 125. In block 125, the test set is translated from the first language (E) into the second language (F) using a translation method other than parallel corpus, e.g., a monolingual corpus for the first language (E→F).

In block 130, the test set is translated back to the first language (E) from the second language (F) using a translation method other than parallel corpus, e.g., the monolingual corpus of the second language (F→E). In block 135, the original test set (E) is compared with the translation arrived at in block 130 (E'). Confidence scores for each item in the set are computed based on the similarity of E to E'.

Once again, any number of translation evaluation metrics may be used in block 135. In one embodiment, Bilingual Evaluation Understudy (BLEU) metrics are used. In another embodiment Translation Edit Rate (TER) metrics are used. The translation evaluation metrics score may also be combined with other features, such as phrase posterior probabilities in n-best hypotheses, to compute the confidence scores.

In block 140, the confidence scores of all items in the test set are ranked. In block 145, two subsets are created. The first subset L is a subset of the items with the lowest confidence scores. The second subset H is a subset of the items with the highest confidence scores.

Subset L proceeds to block 150, where subset L is presented to human translators for correction. In a preferred embodiment, this is done using a Graphical User Interface (GUI) which is described in more detail below. In block 155, the human translators enter corrections to the translations presented in subset L. In block 160, the parallel corpus is updated using these corrections.

Subset H proceeds directly to block 160, where the sentence pairs used in the above process are directly added to the parallel corpus. Since subset H includes the sentence pairs with the highest translation accuracy scores, adding these pairs directly to the parallel corpus does not compromise the accuracy of the parallel corpus. As a result, the phrase coverage of the parallel corpus of E$\leftarrow\rightarrow$F may be improved without the use of human translators, saving both time and expense.

Figure 2:
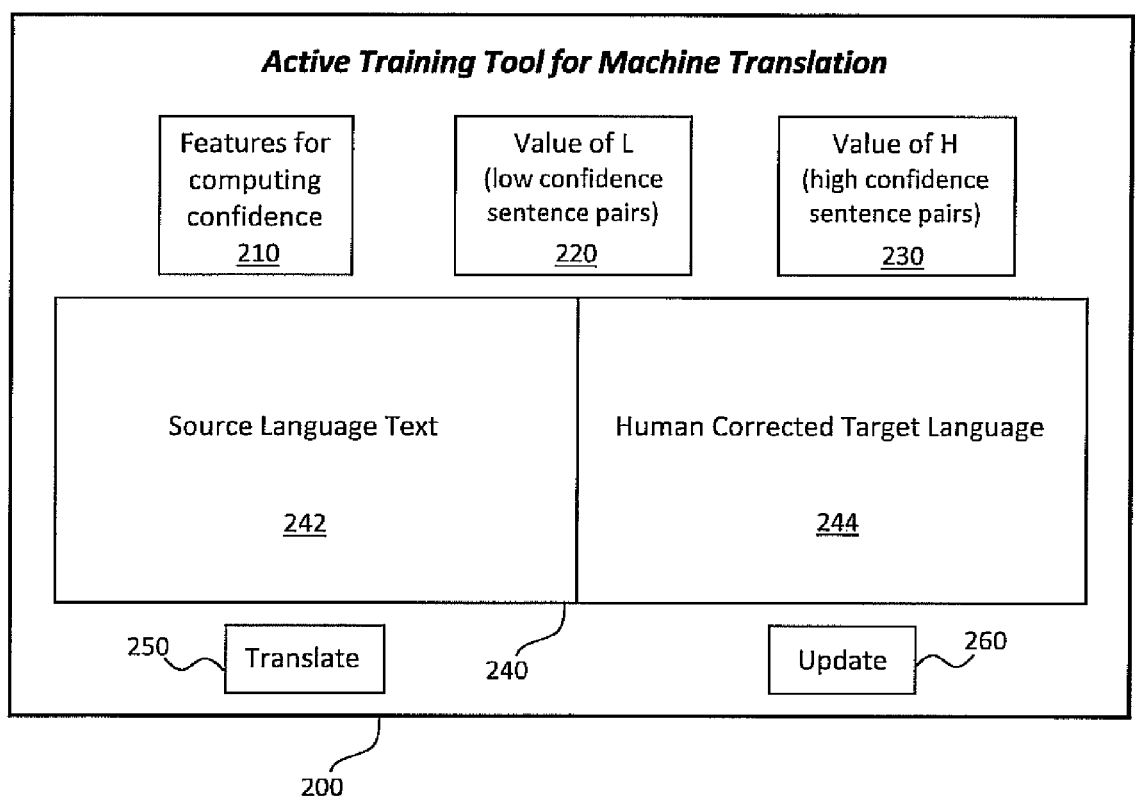
FIG. 2 is an exemplary graphical user interface (GUI) displayed to the user in accordance with one embodiment.

FIG. 2 is an exemplary Graphical User Interface (GUI) 200 displayed to the user in accordance with one embodiment of the present invention. The GUI 200 may include a menu, 210, in which a user can select the features and options to be used in the process of creating or updating the parallel corpus (block 105). The features and option may include, but are not limited to, the scoring metric(s) and other calculation options to be used, for example, in blocks 110 and 135. The GUI 200 may further include fields, 220 and 230, in which the user may change the default confidence score values used to classify the test set into the subsets L and H.

The GUI 200 may also provide a translation correction area 240 which comprises panes 242 and 244. Pane 242 displays to the user the source language text of the items in subset L which need human translation correction. Pane 244 provides a field or fields for the user to input the human corrected translation.

The GUI 200 may further provide at least two buttons. One button is a translate button 250, which allows the user to start the translation process after the user selects the features and options using controls 210, 220 and 230. Another button is an update button 260, which allows the user to enter the human corrected translations made in pane 244 into the parallel corpus of the SMT.

The present invention may be implemented in numerous ways, including as a separate active learning training system to which a translation device can be connected for training or as a feature built into a machine translation system on a translation device.

Figure 3:
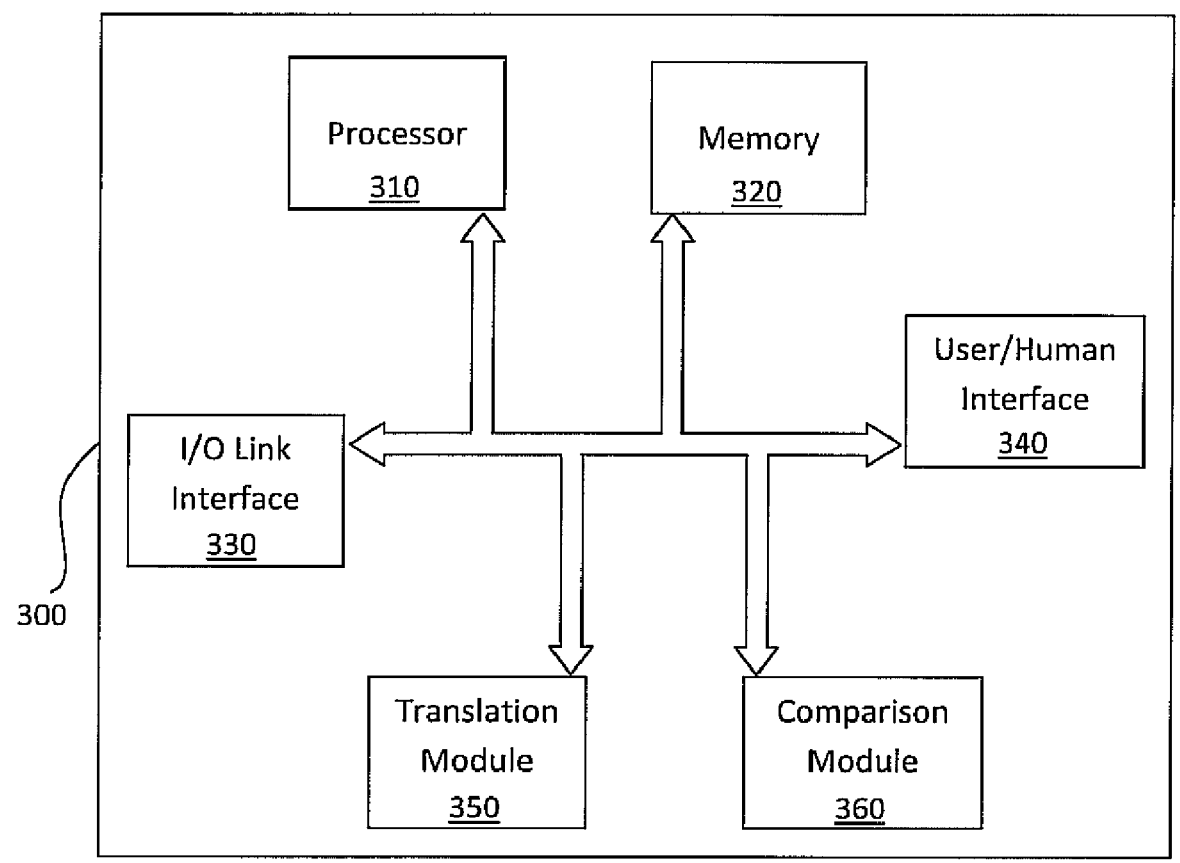
FIG. 3 is an exemplary training system for machine translation systems in which the present invention may be implemented.

FIG. 3 demonstrates an embodiment of an active learning training system 300 in which the present invention may be implemented. The active learning training system 300 may be part of a stand-alone translation training device or may be incorporated as a feature or application in another device, e.g. PDAs, cellular phones, smart phones, laptop computers, desktop computers, server computers, set top boxes, digital music players, and other electronic equipment (this list is included for illustrative purposes only and should not be construed to suggest any limitation on the scope of present invention).

The active learning training system 300 in FIG. 3 includes a processor 310 for executing commands to perform the active learning training method described herein, and memory 320 used during the execution of the process. The memory 320 may be any type of memory storage including, for example, one or more of random access memory (RAM), flash memory, hard drives and solid state drives.

The active learning system 300 further includes and input/output link or interface 330 to which a translation device to be trained may be connected. Examples of input/output links that may be used include networking interfaces, e.g., wired Ethernet connections and wireless connections and USB ports. The input/output link interface may also include removable memory receptor ports (e.g. flash memory card ports) to allow translation devices which store their corpus dictionaries on removable memory (e.g., flash memory) to train their corpus by removing the corpus dictionary memory from the translation device and connecting only the memory to the active learning training system 300 instead of directly connecting the entire translation device.

The active learning training system 300 additionally includes a user/human interface 340 through which the user may interact with the active learning training system as described, for example, in blocks 105 and 155 of FIG. 1. Examples of devices that the active learning training system 300 may implement in the user/human interface include keyboards, mice, monitors, keypads, liquid crystal displays, touch-screen displays, microphones and speakers, among numerous other possible devices. In an exemplary embodiment, the user/human interface includes at least a monitor or display screen which is used to display to the user the GUI 200 described in FIG. 2.

In a further embodiment, the active learning training system 300 may further comprise a translation module 350 which may perform at least the steps of translating the test set from E to F using a monolingual corpus, depicted in block 125 in FIG. 1, and translating the test set from F to E' using a monolingual corpus, shown in block 130 in FIG. 1. The translation module 350 may further perform any other translations, including translations using the parallel corpus.

In yet another further embodiment, the In a further embodiment, the active learning training system 300 may further comprise a comparison module 360 which may perform the steps of computing confidence scores between E and E', as depicted block 135 in FIG. 1. The comparison module 360 may also measure the translation score of the translation of the test set using the existing parallel corpus, as demonstrated in block 110 of FIG. 1. In addition, the comparison module 360 may further perform any or all of the following steps: ranking the confidence scores (block 140 in FIG. 1), creating subset L of translations with lowest confidence scores and subset H of translations with highest scores (block 145 in FIG. 1), and adding the translations in subset H directly to the parallel corpus (block 170 in FIG. 1).

It should be recognized that in an alternate embodiment, translation module 350 and comparison module 360 may not be necessary to the active learning training system 300. In this embodiment, the operations performed by the translation module 350 and comparison module 360 may be performed, instead, by the processor 310.

Figure 4:
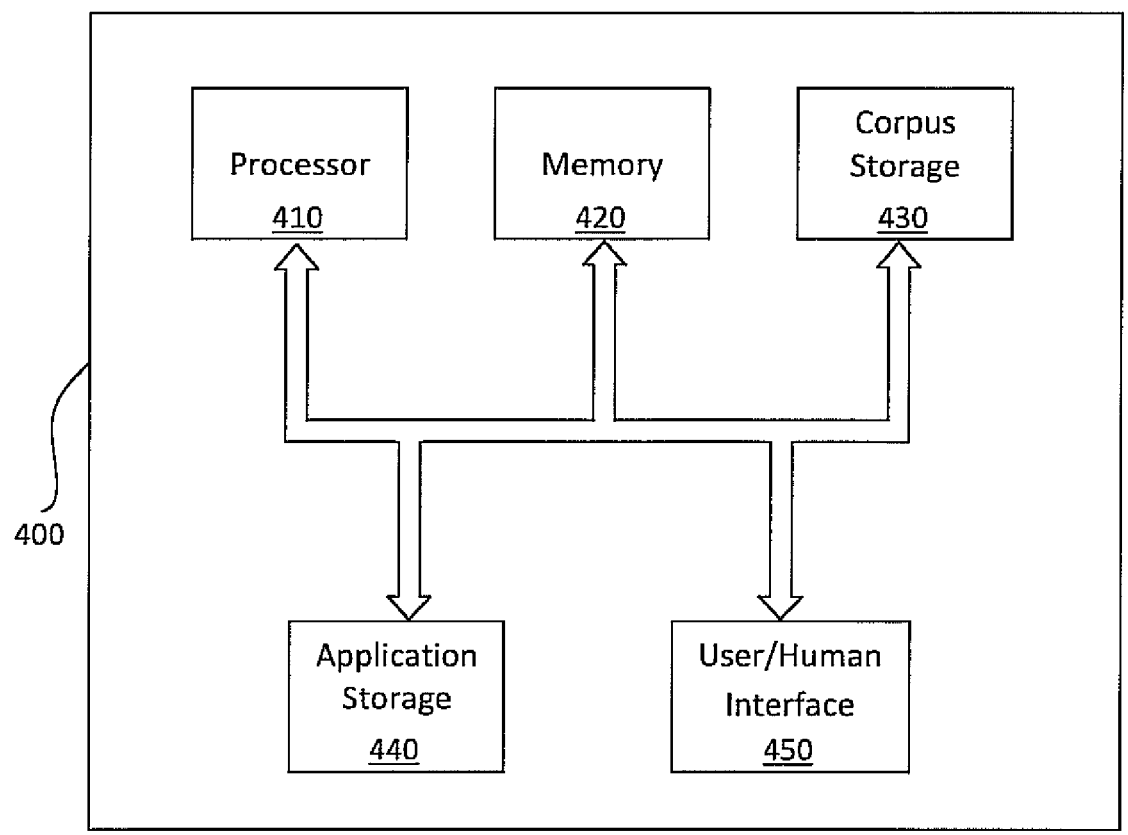
FIG. 4 is an exemplary machine translation system in which the present invention may be implemented.

FIG. 4 demonstrates one embodiment of a machine translation system into which the present invention may be incorporated. Examples of devices implementing such machine translation systems may include stand-alone translation devices (hand-held and/or stationary), PDAs, cellular phones, smart phones, laptop computers, desktop computers, server computers, set top boxes, digital music players, and other electronic equipment. (This list is included for illustrative purposes only and should not be construed to suggest any limitation on the scope of present invention.)

The machine translation system 400 is comprised of a processor 410 and memory 420, which may be used to execute commands for carrying out the active learning training technique described herein, in addition to executing commands to perform translations. The machine translation system 400 also includes corpus storage 430, where at least the parallel corpus for the system is stored, and application storage 440 for storing at least an application implementing the active learning translation described herein. It should be noted, that although the corpus storage 430 and application storage 440 are shown as two separate modules in system 400, they may be stored on either the same storage device or separate storage devices within the system.

Machine translation system 400 further includes a user/human interface 450 through which the user may interact with the active learning training process being run on the translation device in a similar way as described above with reference to the user/human interface 340 in FIG. 3. It should also be noted that although not shown in FIG. 4, the machine translation system 400 may further include the translation module 350 and comparison module 360 depict in FIG. 3.

It is to be appreciated that machine translation system 400 may further include other devices and functionality including, but not limited to removable storage interfaces (e.g. flash memory slots, USB ports, CD/DVD drive(s)) and networking interfaces for, e.g., wired Ethernet connections and wireless connections.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described preferred embodiments of a system and method for active learning of statistical machine translation systems through dynamic creation and updating of parallel corpus (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for creating or updating parallel corpus in a machine translation system, comprising the steps of:
   preparing a test set, E, to be updated;
   translating the test set E from a first language to a second language using a translation method other than parallel corpus, so as to create set F in the second language;
   translating set F back to the first language using a translation method other than parallel corpus so as to create set E' in the first language;
   computing confidence scores for the translation of each item in the set based on the similarity of E and E';
   creating a subset, H, of the highest confidence scores; and
   adding the translations in subset H directly to the parallel corpus without first presenting the translations to a human translator for correction, wherein the parallel corpus is stored in memory on the machine translation system.

2. The method of claim 1 further comprising the steps of:
   creating a subset, L, of lowest confidence scores;
   presenting subset L to human translators for correction; and
   adding the human corrections to the parallel corpus.

3. The method of claim 2 wherein the step of presenting subset L to human translators for correction comprises presenting a Graphical User Interface (GUI) to the translator, the GUI providing at least the items in subset L, a window to make translation corrections, and an update button.

4. The method of claim 1 wherein the step of preparing a test set E to be updated includes presenting a Graphical User Interface (GUI) to a user, the GUI displaying at least controls for changing features to compute confidence scores, the features being at least one of a scoring metric and values used to create subsets L and H.

5. The method of claim 1 wherein the step of preparing a test set E to be updated includes:
   translating a test set using the existing parallel corpus;
   calculating a translation accuracy score for one or more items in the test set;
   comparing the translation accuracy score for each item to a desired performance score to determine whether the parallel corpus needs to be updated for that item; and
   if the translation accuracy score for an item is equal to or greater than a desired performance score, removing that item from the test set, so as to create test set E.

6. The method of claim 5 wherein the translation accuracy score is measured using Bilingual Evaluation Understudy scoring metrics.

7. The method of claim 1 wherein the confidence scores are computed using at least one of Bilingual Evaluation Understudy or Translation Edit Rate scoring metrics.

8. The method of claim 7 wherein the confidence scores are computed further by using phase posterior probabilities in n-best hypotheses.

9. A computer readable storage medium comprising a computer readable program, wherein the computer readable program when executed on a computer causes the computer to perform method steps of:
   preparing a test set, E, to be updated;
   translating the test set E from a first language to a second language using a unidirectional translation corpus, so as to create set F in the second language;
   translating set F back to the first language using a unidirectional translation corpus so as to create set E' in the first language;
   computing confidence scores for the translation of each item in the set based on the similarity of E and E';
   creating a subset, H, of the highest confidence scores; and
   adding the translations in subset H directly to the parallel corpus without first presenting the translations to a human translator for correction.

10. A method for training a machine translation system, comprising the steps of translating a test set from a first language to a second language using the existing parallel corpus stored in memory on the machine translation system;

calculating a translation accuracy score for each item in the test set;

comparing the translation accuracy score for each item to a desired performance score to determine whether the parallel corpus needs to be updated for that item;

if the translation accuracy score for an item is equal to or greater than a desired performance score, removing that item from the test set, so as to create test set E;

translating the test set E from a first language to a second language using a unidirectional translation corpus, so as to create set F in the second language;

translating set F back to the first language using a unidirectional translation corpus so as to create set E' in the first language;

computing confidence scores for the translation of each item in the set based on the similarity of E and E';

creating a subset, H, of highest confidence scores;

adding the translations in subset H directly to the parallel corpus without presenting the translations to a human translator for correction;

creating a subset, L, of lowest confidence scores;

presenting subset L to human translators for correction; and adding the human corrections to the parallel corpus.

11. The method of claim 10 wherein the scoring metric and threshold values used to compute confidence scores are defined by the user.

12. The method of claim 10 further comprising the step of presenting a Graphical User Interface (GUI) to a user, the GUI displaying at least controls for changing features to compute confidence scores, the features being at least one of a scoring metric and values used to create subsets L and H.

13. The method of claim 10 wherein the step of presenting subset L to human translators for correction comprises presenting a Graphical User Interface (GUI) to the translator, the GUI providing at least the items in subset L, a window to make translation corrections, and an update button.

14. The method of claim 10 wherein the translation accuracy score is measured using Bilingual Evaluation Understudy scoring metrics.

15. The method of claim 10 wherein the confidence scores are computed using at least one of Bilingual Evaluation Understudy or Translation Edit Rate scoring metrics.

16. The method of claim 10 wherein the confidence scores are computed further by using phase posterior probabilities in n-best hypotheses.

17. A computer readable storage medium comprising a computer readable program, wherein the computer readable program when executed on a computer causes the computer to perform method steps of:

translating a test set from a first language to a second language using the existing parallel corpus stored in memory on the machine translation system;

calculating a translation accuracy score for each item in the test set;

comparing the translation accuracy score for each item to a desired performance score to determine whether the parallel corpus needs to be updated for that item;

if the translation accuracy score for an item is equal to or greater than a desired performance score, removing that item from the test set, so as to create test set E;

translating the test set E from a first language to a second language using a unidirectional translation corpus, so as to create set F in the second language;

translating set F back to the first language using a unidirectional translation corpus so as to create set E' in the first language;

computing confidence scores for the translation of each item in the set based on the similarity of E and E';

creating a subset, H, of highest confidence scores;

adding the translations in subset H directly to the parallel corpus without presenting the translations to a human translator for correction;

creating a subset, L, of lowest confidence scores;

presenting subset L to human translators for correction; and adding the human corrections to the parallel corpus.

18. An active learning training system, comprising:

a processor for creating or updating a parallel corpus of a machine translation system;

a translation module for translating a test set E from a first language to a second language using a unidirectional translation corpus, and translating the test set back from the second language to the first language using a unidirectional translation corpus so as to create set E' in the first language;

a comparison module for computing confidence scores for the translation of each item in the set based on the similarity of E and E' and adding the translations with the highest confidence scores directly to the parallel corpus without presenting the translations to a human translator for correction;

memory storage for storing the created or updated parallel corpus; and a user interface to allow a user to interact with the active learning training system.

19. The system as recited in claim 18 further comprising a connection port configured for communications with a machine translation device.

20. The system as recited in claim 18 further comprising:

long-term memory storage for a plurality of parallel corpuses; and a translation module capable of performing translations.

21. The system as recited in claim 18 wherein the user interface includes a Graphical User Interface displaying at least controls for changing features to compute confidence scores, the features being at least one of a scoring metric and values used to create the subsets of low and high confidence machine translations.

22. The system as recited in claim 18 wherein the user interface includes a Graphical User Interface (GUI) to the translator, the GUI providing at least the items in the subset of low confidence machine translations, a window to make translation corrections, and an update button.

* * * * *

UNITED STATES PATENT AND TRADEMARK OFFICE
CERTIFICATE OF CORRECTION

| | |
|---|---|
| PATENT NO. | : 8,352,244 B2 |
| APPLICATION NO. | : 12/506483 |
| DATED | : January 8, 2013 |
| INVENTOR(S) | : Yuqing Gao et al. |

It is certified that error appears in the above-identified patent and that said Letters Patent is hereby corrected as shown below:

In the specification,

Col. 1, line 6, please insert,

--GOVERNMENT RIGHTS

This invention was made with Government support under Contract No.: NBCH2030001 awarded by the Defense Advanced Research Projects Agency (DARPA). The Government has certain rights in this invention.--

Signed and Sealed this
Twenty-fourth Day of September, 2013

Teresa Stanek Rea
*Deputy Director of the United States Patent and Trademark Office*